(No Model.)

R. L. ELLERY.
CAR TRUCK.

No. 483,211. Patented Sept. 27, 1892.

Witnesses:
H. E. Renwick Jr.
John R. Snow.

Inventor:
Robert L. Ellery,
by his attorneys,
Magruder & Beach.

UNITED STATES PATENT OFFICE.

ROBERT L. ELLERY, OF TAUNTON, MASSACHUSETTS, ASSIGNOR OF ONE-HALF TO FRANCIS E. FULLER, OF SAME PLACE.

CAR-TRUCK.

SPECIFICATION forming part of Letters Patent No. 483,211, dated September 27, 1892.

Application filed December 26, 1891. Serial No. 416,166. (No model.)

*To all whom it may concern:*

Be it known that I, ROBERT L. ELLERY, of Taunton, in the county of Bristol and State of Massachusetts, have invented a new and useful Improvement in Car-Trucks, of which the following is a specification, reference being had to the accompanying drawings, in which—

Figure 1:
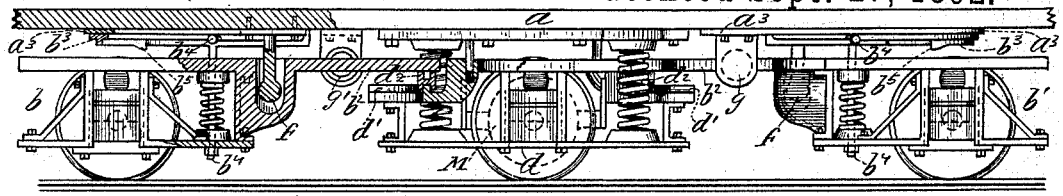
Figure 2:
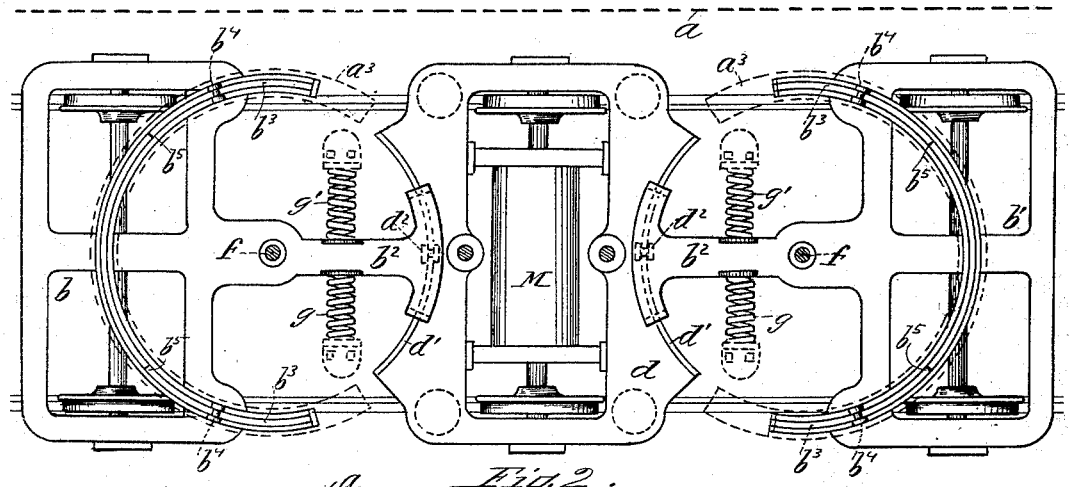
Figure 3:
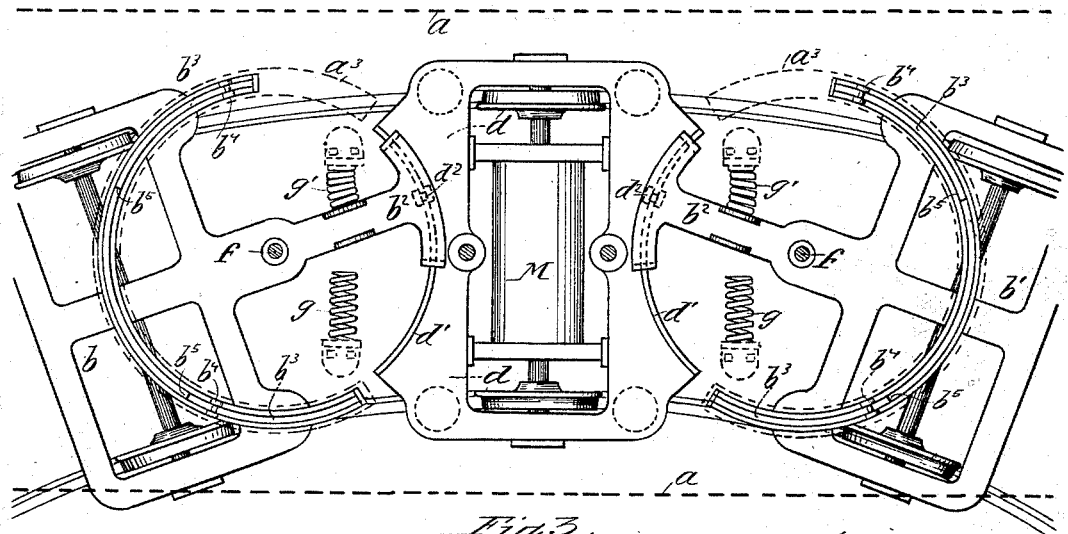

Figure 1 is a side view of so much of a car provided with my trucks as is necessary to illustrate my invention, a part being in section for greater clearness. Fig. 2 is a plan of what is shown in Fig. 1, the bottom of the car-body being indicated by dotted lines. Fig. 3 is a similar view, except that the trucks are on a curved track.

My invention relates to car-trucks, and while especially adapted to street-railway cars is obviously not limited thereto.

It consists in the combination of a main or driving truck fast to the car-body and an end truck, so that part of the weight bearing on the end truck is sustained by the main truck. In the preferred form of my invention I use two end trucks and the main or driving truck as the middle truck.

In the drawings, showing the best mode which I have contemplated of applying the principle of my invention, $a$ indicates a part of a car or other vehicle body. $b$ $b'$ are the end trucks, and $d$ the middle truck. Trucks $b$ $b'$ are connected to body $a$ by king-bolts $f$, and each is provided with a tongue $b^2$, the inner end of each tongue projecting over the middle truck $d$, provided at each side with a curved track $d'$, between which and each overlapping tongue $b^2$ a friction-roll $d^2$ is interposed. Each end truck carries a plate $b^3$, supported by yielding studs $b^4$. The plates $b^3$ are curved, and body $a$ is provided with similarly-curved plates $a'$, one over each plate $b^3$. Antifriction-rolls $b^4$ are interposed between each set of plates $a'$ $b^3$. Compression-springs $g$ $g'$ are provided for lining up the trucks with the straight track, a spring being located on each side of each tongue $b^2$. These springs are conveniently mounted on abutments fast to the body $a$, and one or the other spring of each set is under tension whenever a truck swings with relation to the car-body. When the car passes from a curved to a straight track, the compressed spring is relieved and tends with its companion to keep the tongue in line with the straight track. The middle truck supports the car-body in the usual way; but the weight of the car-body rests upon the end trucks at points between the axle of each end truck and the axle or axles of the middle truck, for while the end trucks can have but one axle the middle truck may have either one or more axles. The weight of the car-body rests upon the end trucks at one side only of the axles and so as to tend to throw the tongue of each end truck downward, and these tongues rest upon the middle truck. When the car rests upon the end trucks, as shown in the drawings, the load on each end truck is only two-thirds of the actual weight, for the other third is thrown onto the middle truck, for the end truck may be regarded as a lever, with the axle as a fulcrum and the weight applied at one-third of the length of the lever-arm. The tongue, being sustained upon the middle truck, thus transmits one-third of the weight. The end trucks move about their king-bolts when the car travels on a curved track, as illustrated in Fig. 3; but the middle truck does not vary its relation with the car. The motor $m$ is carried by the middle truck, and this is also one feature of my invention—that is, the middle truck, in combination with two end trucks, each with a single axle and each throwing part of its burden on the middle truck, is the best form of my invention, and the combination with this of a motor on the middle truck is another feature of my invention, for by thus throwing part of the weight resting on each end truck upon the middle truck I increase the traction of the middle truck and make it especially adapted for a driving-truck.

What I claim as my invention is—

1. In combination, a car-body, a main truck fast to the car-body, and a two-wheeled truck to support part of the weight of the car and with its inner end supported by the main truck, all substantially as described.

2. In combination, a car-body, a middle truck fast to the car-body, and front and rear two-wheeled trucks, each to support a part of the weight of the car-body and each with its inner end supported by the main truck, all substantially as described.

3. In combination, a car-body, a middle truck fast to the car-body, a two-wheeled truck to support part of the weight of the car and with its inner end supported by the main truck, and a motor driving the wheels of the middle truck, all substantially as described.

ROBERT L. ELLERY.

Witnesses:
J. MAYNADIER BROWNE,
J. E. MAYNADIER.